United States Patent [19]

Houd et al.

[11] 4,389,252
[45] Jun. 21, 1983

[54] PLANT FOR MANUFACTURING CEMENT CLINKER

[75] Inventors: Rolf D. Houd; Hans B. Knudsen, both of Copenhagen, Denmark

[73] Assignee: F. L. Smidth & Co., Cresskill, N.J.

[21] Appl. No.: 212,401

[22] Filed: Dec. 3, 1980

[30] Foreign Application Priority Data

Dec. 12, 1979 [GB] United Kingdom ............... 7942891

[51] Int. Cl.³ .............................................. C04B 7/02
[52] U.S. Cl. ................................. 106/100; 432/103; 432/105; 432/107; 432/111
[58] Field of Search ............... 106/100; 432/103, 105, 432/107, 111

[56] References Cited

U.S. PATENT DOCUMENTS 3,451,665  6/1969  Strassen .............................. 106/100
3,498,594  3/1970  Rikhof .................................. 106/100

Primary Examiner—James Poer
Attorney, Agent, or Firm—Pennie and Edmonds

[57] ABSTRACT

A plant for manufacturing cement clinker from cement raw material includes a preheater first stage separated by a wall into a first chamber and a second chamber. Only raw material is passed through the first chamber while only hot exit gases are permitted to pass through the second chamber. Thus the raw material including any volatile, combustion components are kept isolated from direct contact with the hot exit gases. A heat exchange system is provided to permit the transfer of heat from the hot exit gases in the second chamber to the raw material in the first chamber. The heat exchange system preferably includes self-contained heat pipes extending into both the first and second chambers. The heat pipes contain a fluid medium which aids in the heat transfer as a consequence of cylical changes of the fluid medium from a liquid to a vapor state. In one preferred embodiment to obtain improved heat transfer, granular heat-resistant material is placed within the second chamber and is formed into an expanded fluidized bed.

9 Claims, 1 Drawing Figure

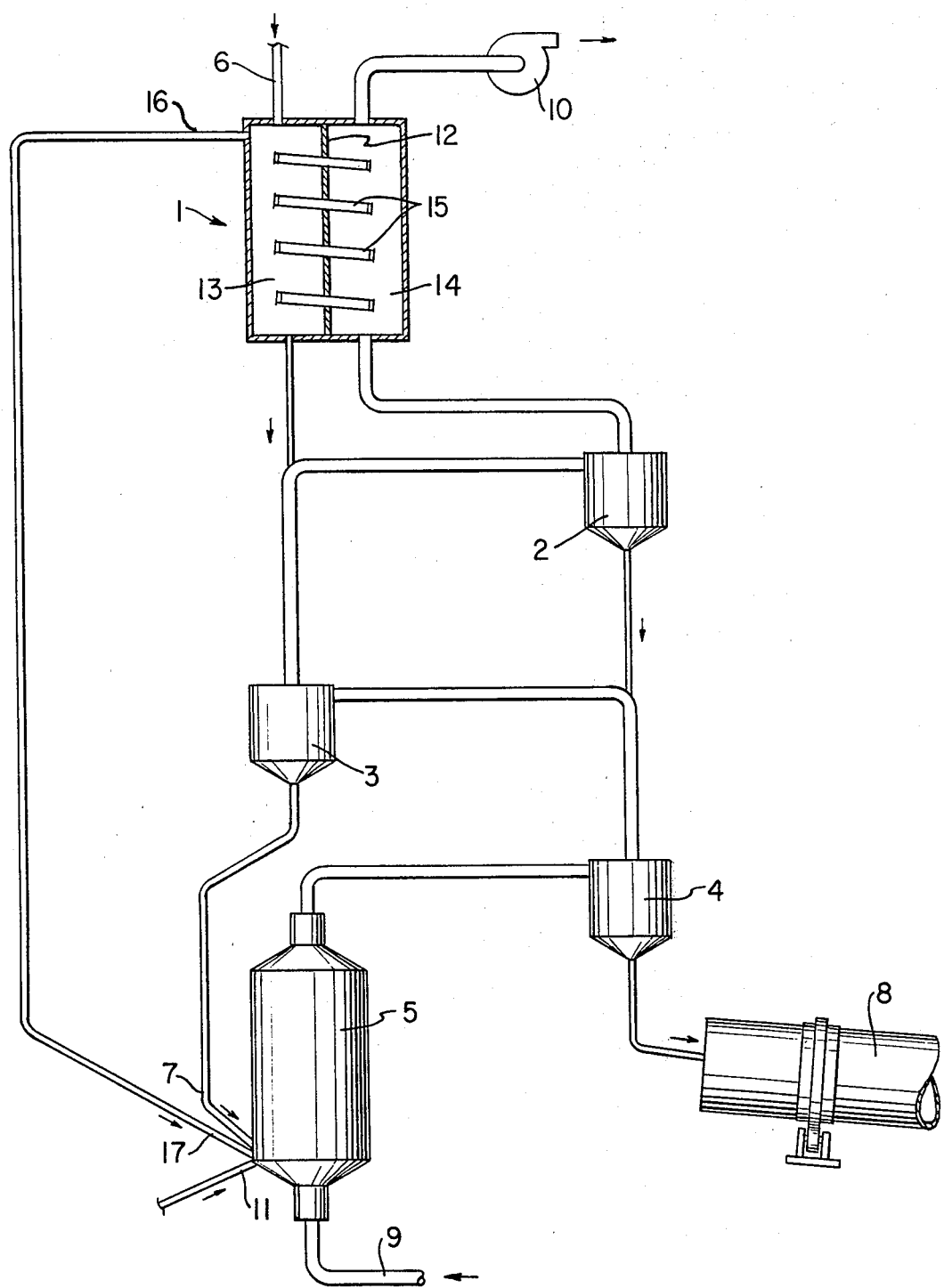

PLANT FOR MANUFACTURING CEMENT CLINKER

TECHNICAL FIELD

The invention relates to a plant for manufacturing cement clinker from cement raw material which is burnt in a kiln and in particular to a plant wherein the raw material is heated in a multi-stage preheater by hot gases.

BACKGROUND ART

Known plants for manufacturing cement clinker may comprise several cyclone stages in succession through which pass hot gases such as exit gases from, e.g., a calciner and/or the kiln. Raw meal is supplied to the first cyclone stage and passed countercurrently to the hot exit gases down through a cyclone preheater to the calciner from which the precalcined raw meal is fed via a cyclone separator to the kiln. Combustion air for the calciner may, e.g., be supplied from a clinker cooler coupled after a kiln.

Preheating of the raw material in the preheater is obtained by contact. Thus direct heat transfer occurs between the raw material and the exit gases.

If a cyclone preheater as described above—i.e. wherein direct contact occurs between the raw material and the exit gases—is used for preheating raw material having volatile, combustible components, a risk of explosion will be imminent when the combustible components have been expelled from the raw material and are absorbed in the exit gases. Additionally, the heating performance of the expelled gases is lost.

The present invention relates to an apparatus for use with a kiln for manufacturing cement clinker comprising at least one multi-stage preheater for passage of cement raw material therethrough, the at least one multi-stage preheater having at least one cyclone stage heated by exit gases, means associated with at least one preheater stage for separating the cement raw material from said exit gases, and means for transferring heat indirectly from said exit gases to the cement raw material.

In a preferred embodiment, the present invention relates to an apparatus for manufacturing cement clinker from cement raw materials having volatile, combustible components, comprising a kiln provided with a clinker cooler and a multi-stage preheater for passage of the cement raw material therethrough, the preheater being heated by hot exit gases from at least one of the kiln and the clinker cooler and having at least one cyclone preheater stage, means provided in at least one stage of the multi-stage preheater for separating the cement raw material from the exit gases, and means for transferring heat indirectly from the exit gases to the cement raw material such that the volatile, combustible components may be expelled from the cement raw material without explosion of the volatile, combustible components.

The present invention also relates to a plant for manufacturing cement clinker from cement raw material characterized in that at least the first stage of the preheater comprises a heat exchanger having a raw material section, a separate hot gas section, and means for enabling indirect heat transfer between the hot gas section and the raw material section.

The hot gases typically will be the exit gases from the kiln and/or calciner. Alternatively, they may be hot air from the cooler depending on the design of the plant.

The present invention also relates to a method of manufacturing cement clinker from cement raw material including the steps of heating the raw material by passing it in a first stream through a heat exchanger forming at least the first stage of a multi-stage preheater and indirectly transferring heat from a separate stream of hot gases fed through the heat exchanger.

The present invention also relates to a method for use with a kiln for manufacturing cement clinker in an apparatus including at least one multi-stage preheater for passage of cement raw material therethrough, the at least one multi-stage preheater having at least one cyclone stage heated by exit gases, comprising maintaining the cement raw material separate from the exit gases, and transferring heat indirectly from the exit gases to the cement raw material.

Since the hot gases are kept separate from the raw material during the expulsion of any volatile, combustible components of the raw material, the hot gases do not become explosive. In addition, the hot gases do not contain components which may cause air pollution. Furthermore, the volatile, combustible components expelled from the raw material can be utilized in the kiln or the calciner as additional fuel instead of being wasted.

In the preferred embodiment of the present invention, the heat exchanger may advantageously have two chambers, hot gases flowing through one of the chambers, and raw material flowing through the other. The chambers are separated by a partition through which so called "heat-pipes" project into both chambers so as to ensure heat transfer from the hot gas chamber to the raw material chamber.

Such heat-pipes are of the type known to those skilled in the art. In their simplest form, the heat-pipes may be lengths of pipes closed at both ends containing a fluid capable of evaporating and condensing. The fluid absorbs heat and evaporates at the relatively hot end of each pipe and then condenses thereby releasing heat at the relatively cold end. The condensed fluid is then returned to the hot end of the pipe. For this purpose the pipes may be slightly inclined with the relatively hot ends being in the lowermost position.

The hot gas chamber of the heat exchanger may contain a granular, heat-resistant material for the formation of an expanded fluidized-bed made fluid by means of the hot gases passing therethrough. In this fashion, the heat transfer from the hot gases to the heat-pipes is thereby improved.

As a result of the raw material flowing downwards in the raw material chamber of the heat exchanger, fluidized bed-like conditions are already present in this chamber, which gives effective heat transfer from the heat-pipes to the raw material.

BRIEF DESCRIPTION OF THE DRAWINGS

The present invention is described in detail below with reference to the FIGURE diagrammatically illustrating a plant for manufacturing cement clinker in accordance with the present invention.

BEST MODE FOR CARRYING OUT THE INVENTION

Referring to the FIGURE, a plant for manufacturing cement clinker is shown comprising a multi-stage preheater including heat exchanger 1, two preheater cyclones 2, 3, a separating cyclone 4, a calciner 5 and a rotary kiln 8.

Raw material is fed to the next exchanger 1 through an inlet 6, and is then fed via the cyclones 2, 3, to a raw material inlet 7 of the calciner 5, through the calciner 5 to the separating cyclone 4, and thence to the rotary kiln 8.

In the example shown, combustion air is supplied to the calciner 5 from a clinker cooler (not shown) through a pipe 9. The hot exit gases from calciner 5 are drawn up through the cyclone 4, 3, 2 and the heat exchanger 1 by a fan 10. The calciner 5 is supplied with fuel at 11.

The heat exchanger 1 is divided by a partition wall 12 into two chambers 13, 14. In this fashion, only raw meal flows through the chamber 13 to the left of partition wall 12 while only exit gases flow through the other chamber 14 to the right of partition wall 12 as shown in the FIGURE.

For heat transfer between the two chambers 13 and 14, the chambers are interconnected by means of heat-pipes 15 extending through the partition wall 12 and projecting into each chamber.

Although the heat-pipes 15 may be of an advanced type, preferably in their simplest form they are lengths of pipes closed at both ends containing a fluid medium capable of evaporating and condensing. Accordingly, the medium is partly in the form of a liquid and partly in the form of a vapor within the heat-pipes 15. The liquid absorbs heat and evaporates in the pipe ends located in the relatively hot exit gas chamber 14. The vapor then condenses thereby releasing heat at the pipe ends located in the relatively cold raw material chamber 13. In this manner, heat is transferred from the chamber 14 to the chamber 13.

To facilitate the return of condensate in the pipes from the chamber 13 to the chamber 14, the heat-pipes 15 may be slightly inclined downwardly towards the chamber 14.

By heating the raw meal in the chamber 13 any volatile, combustible components are expelled from the raw material, and according to the present embodiment pass out of the heat exchanger at 16. These combustible components then pass down to and, at 17, into the calciner 5 where the components are utilized as additional fuel. Thus, the volatile combustible components are not wasted and the risk of explosion caused by the components being mixed with the exit gases as was the case in known plants is prevented.

When the raw material has been cleaned of volatile components, it passes from the heat exchanger 1 in a known manner to the next cyclone stage 2 where it comes into direct contact with the exit gases.

In the left chamber 13 of the heat exchanger 1, the raw material is in a fluidized bed-like state. This results partly because the raw material cascades onto the heat-pipes 15, and partly because of the expulsion of volatile components. The fluidized bed-like state provides for improved heat transfer from the heat-pipes 15 to the raw material.

Similarly, improved heat transfer from the exit gases to the heat-pipes 15 can be obtained in the right chamber 14 of the heat exchanger 1 by employing a granular, heat resistant material in the chamber 14, through which the exit gases flow. Upon the passage of exit gases through the chamber 14, an expanded fluidized bed of the heat-resistant material therein is formed. The word "expanded" is used in its usual sense in this context to indicate a fluidized bed in which there are gas inclusions which increase the height of or "expand" the bed.

We claim:

1. An apparatus for use with a kiln for manufacturing cement clinker comprising at least one multi-stage preheater for passage of cement raw material therethrough, the raw material having volatile, combustible components, said at least one multi-stage preheater having at least one cyclone stage heated by exit gases, means provided in at least one preheater stage for separating the cement raw material from said exit gases, and means for transferring heat indirectly from said exit gases to the cement raw material in such a manner that the volatile, combustible components are expelled from the cement raw material without explosion of said volatile, combustible components.

2. An apparatus for manufacturing cement clinker from cement raw material having volatile, combustible components, comprising a kiln provided with a clinker cooler and a multi-stage preheater for passage of the cement raw material therethrough, said preheater being heated by hot exit gases from at least one of said kiln and said clinker cooler and having at least one cyclone preheater stage, structural means provided in at least one stage of said multi-stage preheater for separating the cement raw material from said exit gases, and means for transferring heat indirectly from said exit gases to the cement raw material such that said volatile, combustible components may be expelled from the cement raw material without explosion of said volatile, combustible components.

3. The apparatus according to claim 2 wherein said structural separating means comprises a wall member dividing at least one stage of said multi-stage preheater into first and second chambers, said first and said second chambers being configured such that only cement raw material passes through said first chamber and only said exit gases pass through said second chamber.

4. The apparatus according to claim 3 wherein said heat transferring means comprises a plurality of heat pipes extending through said wall member into said first and said second chambers.

5. The apparatus according to claim 4 wherein each of said heat pipes has a first end disposed within said first chamber and a second end disposed within said second chamber, said first and said second ends being closed.

6. The apparatus according to claim 5 wherein each of said heat pipes contains a fluid medium therein having a first portion being in a generally liquid state disposed adjacent said second end and the remaining portion being in a generally vapor state disposed adjacent said first end, said first portion absorbing heat from said exit gases so as to evaporate into said generally vapor state, and said second portion releasing heat to the cement raw material so as to condense into said generally liquid state.

7. The apparatus according to claim 6 wherein each of said heat pipes is inclined in a generally downward direction towards said second chamber so as to facilitate the return of said fluid medium in a generally liquid state towards said second end of said heat pipe.

8. The apparatus according to claim 7 wherein said second chamber contains a granular, heat-resistant material for the formation of an expanded fluid-bed in said second chamber so as to improve the transfer of heat from said exit gases to said heat pipes and thereby to the cement raw material.

9. An apparatus for manufacturing cement clinker from cement raw material with volatile, combustible components, comprising a kiln with clinker cooler and multi-stage cyclone preheater heated by exit gases, characterized in that at least the first stage of the cyclone preheater is constituted by a heat exchanger with complete separation between a raw material section and an exit gas section, the heat exchanger having means for indirect heat transfer between the exit gas and the raw material.

* * * * *

UNITED STATES PATENT AND TRADEMARK OFFICE
CERTIFICATE OF CORRECTION

PATENT NO. : 4,389,252

DATED : June 21, 1983

INVENTOR(S) : Rolf D. Houd et al.

It is certified that error appears in the above-identified patent and that said Letters Patent is hereby corrected as shown below:

In Column 1, before the paragraph beginning on line 35, insert --DISCLOSURE OF INVENTION--.

In Column 2, line 62, "FIGURE" should be --FIG.--.

In Column 2, line 67, "FIGURE" should be --FIG.--.

In Column 3, line 4, "the next exchanger" should be --the heat exchanger--.

In Column 3, line 19, "FIGURE" should be --FIG.--.

In Column 3, line 65, "heat resistant" should be --heat-resistant--.

Signed and Sealed this

Twenty-fifth Day of October 1983

[SEAL]

Attest:

GERALD J. MOSSINGHOFF

Attesting Officer        Commissioner of Patents and Trademarks